United States Patent [19]

Bals

[11] 4,266,794
[45] May 12, 1981

[54] TWO-WHEELED VEHICLE

[76] Inventor: Hans G. Bals, Blümgesgrund 44, Gelnhausen, Fed. Rep. of Germany

[21] Appl. No.: 927,004

[22] Filed: Jul. 24, 1978

[30] Foreign Application Priority Data

Jul. 30, 1977 [DE] Fed. Rep. of Germany ....... 2734560

[51] Int. Cl.² .................. B62M 1/20; A63B 69/16
[52] U.S. Cl. .................................. 280/227; 272/73; 280/226 R
[58] Field of Search ............... 280/226 R, 226 H, 227, 280/221, 220, 222, 224, 230, 231, 1.191, 1.192; 272/73

[56] References Cited

U.S. PATENT DOCUMENTS

| 587,318 | 8/1897 | Lilly | 280/226 R |
| 704,377 | 7/1902 | Rieber | 280/226 R |
| 1,141,364 | 6/1915 | Spanovic | 280/230 |
| 3,024,023 | 3/1962 | Steller | 272/73 |

FOREIGN PATENT DOCUMENTS

| 646688 | 6/1937 | Fed. Rep. of Germany | 280/1.191 |
| 248369 | 4/1947 | Switzerland | |
| 8803 | of 1891 | United Kingdom | 280/226 R |
| 26434 | of 1897 | United Kingdom | 280/226 R |

Primary Examiner—Richard A. Bertsch
Assistant Examiner—Donn McGiehan
Attorney, Agent, or Firm—Larson, Taylor and Hinds

[57] ABSTRACT

A two-wheeled vehicle similar to a bicycle has a frame comprising four pivotably interconnected frame members of which the lower one is provided with a bearing for a sprocket wheel of a chain drive. A crank arm is connected to the sprocket wheel and cooperates with a connecting rod pivotably connected to the upper frame member carrying a saddle. Pedals are mounted on the lower frame member or the front frame member, the latter guiding the steering handle and the front wheel fork. The driving torque is achieved by alternatively shifting the weight between the saddle and the pedals. The saddle moves up and down reciprocally to the pedals and the steering handle forth and back giving the illusion of riding on horseback. The same structural principle is suitable also for a home-trainer.

17 Claims, 9 Drawing Figures

TWO-WHEELED VEHICLE

FIELD OF THE INVENTION

The invention relates in general to a two-wheeled vehicle similar to a bicycle comprising a frame, circular wheels with tires, a steering handle, a saddle, pedals, a chain drive and the usual facultative accessories like lamps, brakes, mudguards and a gear shift.

BACKGROUND AND SUMMARY OF THE INVENTION

Normally all parts of a bicycle frame are firmly interconnected as by welding or soldering, except the steering handle together with the front wheel fork which are pivotable about an almost vertical axis. The pedals are rotatably mounted on crank arms fixed to the shaft of the driving sprocket wheel of the chain drive.

There are further known many complicated two-wheeled vehicles which are intended to make better use of the forces exerted by the driver's arms and legs when they are moved, e.g. in the form of movements similar to those of a rower. Normally, in these cases there is still a rigid frame with additional levers, racks and gears for transmitting torque to one of the wheels.

It is the purpose of this invention to provide a two-wheeled vehicle which is essentially as simple as a bicycle, imitates the movement of riding on horseback or rocking in a harmonic swing and consequently creates the illusion that riding at a certain speed is easier than with a normal bicycle.

It is another purpose of this invention to provide a two-wheeled vehicle with an articulated frame in which all frame members are used as cooperating levers for transmitting the forces from the driver's legs and arms and mainly from his weight to the driven wheel.

A main feature of the present invention includes a frame comprising four pivotably interconnected main frame members of which the upper frame member carries a saddle, the front frame member is provided with a bearing for a steering handle and a front wheel fork, the lower frame member is supported as a rocker on the axle of a rear wheel and is provided with a bearing for a driving sprocket wheel of a chain drive transmitting torque to the rear wheel, and the rear frame member is a link between the upper and lower frame members. It further includes pedals connected to the front or lower frame member, a crank arm fixed to the driving sprocket wheel and a connecting rod between the crank arm and the upper frame member.

The operation of a vehicle constructed in accordance with the present invention can best be understood if it is recognized that the axis of the driving sprocket wheel rotates about the joint between the crank arm and the connecting rod. In a first phase of two cyclically alternating phases of movement the driver, by shifting his weight unto the pedals and unburdening the saddle, presses the axis of the sprocket wheel downwards in relation to the joint between the crank arm and the connecting rod. In the second phase the driver, by shifting his weight onto the saddle and unburdening the pedals, cause the rear frame member to pivot the lower frame member counterclockwise thereby lifting the axis of the driving sprocket wheel in relation to the joint between the crank arm and the connecting rod. The aforementioned forces exerted by weight of the driver are augmented by the driver pulling at the steering handle during the first phase and pushing the steering handle forward during the second phase.

The rotation of the axis of the driving sprocket wheel about the joint between the connecting rod and the crank arm is accompanied by a rotation of the sprocket wheel about its own axis which is transmitted via the chain to the hub of the rear wheel as is conventional. At the same time the crank arm and the connecting rod produce a toggle motion which causes the principally quadrangular articulated frame alternatively to stretch and to contract in diagonal directions that lift and lower the saddle and the pedals reciprocally and move the steering handle forth and back in the driving direction. These movements give a cyclist the impression of riding on horseback.

BRIEF DESCRIPTION OF THE DRAWINGS

There follows a detailed description of preferred embodiments of the present invention together with accompanying drawings. However, it is to be understood that the invention is capable of numerous modifications and variations apparent to those skilled in the art without departing from the spirit and scope of the invention.

In the drawings

DETAILED DESCRIPTION OF PREFERRED EMBODIMENTS

In the accompanying drawings like numerals are employed to designate like parts throughout.

Figure 1:
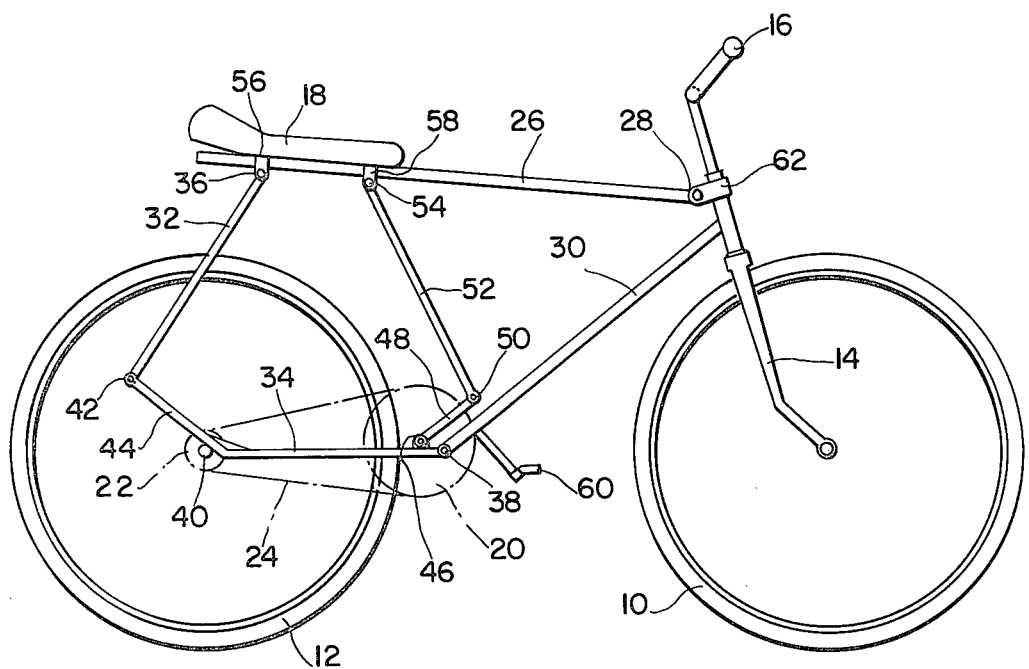
FIG. 1 is a diagrammatic elevation of a first embodiment of the invention.

Referring to FIG. 1 it can be seen that a vehicle constructed in accordance with the present invention corresponds to a normal bicycle by having wheels 10,12, a front wheel fork 14 and a steering handle 16. Also the saddle 18 and the chain drive comprising a driving front sprocket wheel 20, a driven rear sprocket wheel 22 and a chain 24 are standard parts. Conventional accessories like lamps, brakes and mud guards (not shown) may also be employed.

One special feature of a vehicle constructed in accordance with the present invention is the provision of various joints between main frame parts allowing relative pivoting movements of these parts. All the joints have a horizontal pivot axis.

In detail the frame consists of an upper frame member 26 which by means of a joint 28 is connected to a front frame member 30, the latter being provided with a normal bearing for the front wheel fork 14 and the steering handle 16. The front frame member 30 is connected to a lower frame member 34 by means of a joint 38 and a rear frame member 32 is connected between the rear ends of the upper frame member 26 and the lower frame member 34 by means of joints 36 and 42. Frame members 32 and 34 each consist of two parallel rods, one on each side of the rear wheel 12. The rods of the lower frame member 34 support the axle 40 of the rear wheel 12 by means of the usual slot and nut connection and as shown in FIG. 1 can be formed with a sharp or rounded bend of between 10°-60° so that their rear ends, designated 44, point upwards.

In order to be able to use as many standard bicycle parts as possible in the preferred embodiments of the invention the bearing 46 of the driving sprocket wheel 20 is arranged at the lower frame member 34 separate from the joint 38. This allows a conventional bearing unit to be employed for the bearing 46. However, it should be observed that the bearing 46 could be arranged coaxially with the joint 38.

Crank arms 48 are unrotatably fixed to the axle of the driving sprocket wheel 20, and, unlike conventional bicycles, do not extend in opposite direction and do not support pedals. Crank arms 48 both extend instead in the same direction and at their free ends are connected to connecting rods 52 by means of coaxial joints 50. The connecting rods 52 at their upper ends are pivotably connected to the upper frame member 26 by means of a joint 54. Instead of using parallel crank arms 48 and connecting rods 52 in pairs there can be used one single crank arm 48 cooperating with one single connecting rod 52.

In the embodiment according to FIG. 1 each of the joints 36, 54 and 28 has one part thereof made in form of a clamp ring. The clamp rings have been designated 56, 58 and 62, respectively. This allows the position of the joints 36 and 54 to be adjusted along the length of the upper frame member 26 and the position of the joint 28 to be adjusted along the bearing part of the front frame member 39. By changing the position of the joints 36, 54 and 28, particularly the position of joints 36 and 54, it is possible to change the geometrical laws of movement and acceleration of the saddle and the steering handle during one revolution of the driving sprocket wheel 20. In a more stable and robust embodiment those parts of the joints 36 and 54 which abut the upper frame member 26 are firmly welded or soldered to the latter and in the same way one part of the joint 28 is fixedly connected to the front frame member 30.

Referring to FIG. 1 pedals 60 are mounted at the lower end of front frame member 30. The pedals 60, in contrast to conventional bicycles, need not be rotatable, but, for example, can be a simple transverse bar of circular oval or rectangular section firmly connected as by welding or screws to the frame. Connection by screw bolts and nuts allows adjustment of the level of the pedals 60 in accordance with the stature of the cyclist. For the same reason the position of the saddle 18 may be adjustable along the upper frame member 26 and/or in its level.

In FIG. 1 the vehicle is shown in a phase, which could be called the sitting phase, in which propulsion is generated by loading the saddle. Consequently it is sufficient in the phase of operation for the cyclist just to sit down in order to start the vehicle. The weight of the cyclist via the rear frame member 32 presses on the rear end 44 of the lower frame member 34, turning the latter counterclockwise about the axis 40 of the rear wheel 12. By this movement of lower frame member 34 the axis of the driving sprocket wheel 20 is brought up at the same time the joint 50 at the radial outer end(s) of the crank arm(s) 48 is (are) brought down by the connecting rod(s) 52. The torque thus exerted on the crank 48 is transmitted to the rear wheel via the chain drive.

The phase of movement just described above continues until the saddle 18 has reached its lowest, and the pedals have reached their highest, level, in which position the crank arms 48 point downwards. Then the cyclist has to shift the greater part of his weight from the saddle to the pedals thereby turning the lower frame member 34 clockwise, lifting the saddle 18 and lowering the axis of the driving sprocket wheel 20 in relation to joint 50 so that again a torque is created at the crank arms 48 which via the chain drive rotates the rear wheel 12. During the aforementioned two phases of propulsion the diagonal width of the frame is alternatingly shortened and expanded by the toggle lever action of crank arms 48 cooperating with connecting rods 52. During expansion the distance between joints 36 and 38 and the angle between the upper frame member 26 and the main part of front frame member 30 is enlarged so that the steering handle 16 moves back nearer to the saddle 18. Steering handle 16 returns toward its forward end position in the next phase.

Figure 3A:
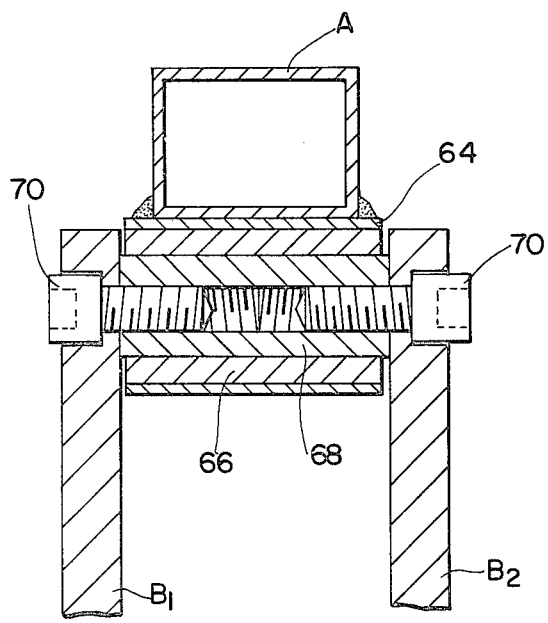
FIGS. 3a,b show one of the joints of the frame in section and elevation.
Figure 3B:
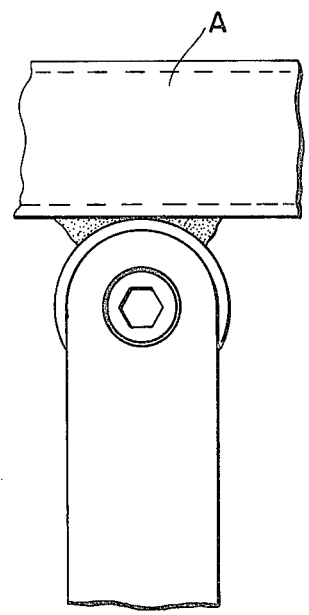

In a first practical embodiment corresponding to FIG. 1 with 26″ wheels the upper frame member 26 has a length of 85 cm, the front frame member 30 between joints 28 and 38 is 60 cm, the lower frame member 34 between joint 38 and the axis 40 of the rear wheel is 37 cm and its rear part 44 is 18 cm. The length of the rear frame member 32 is 40 cm, the crank arms 48 are 12 cm and the connecting rods 52 are 38 cm long. The distance between the joints 28 and 54 can be adjusted to be, e.g., 50 cm and the distance between joints 36 and 54 can be chosen as 25 cm. The joints 42 and 50 comprise ball bearings whereas the joints 28, 36, 38 and 54 have the form of bearings as shown in FIGS. 3a and 3b, and as described in detail below.

Figure 2:
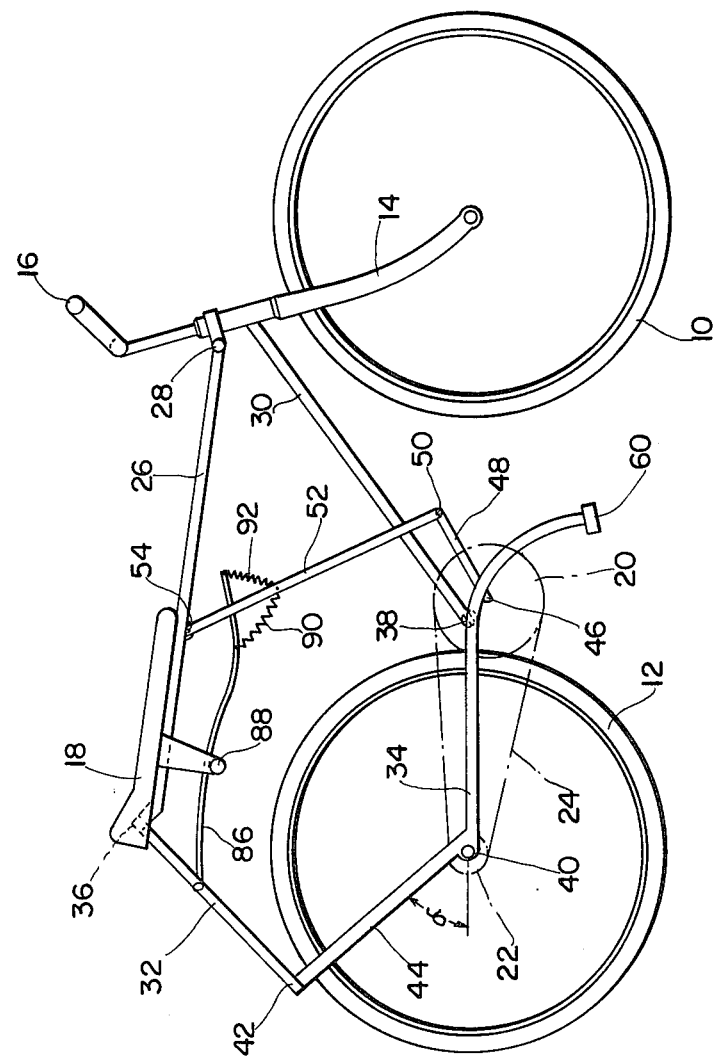
FIG. 2 is a diagrammatic elevation of modified embodiment.

The embodiment shown in FIG. 2 has an upper frame member 26 and front frame member 30 of about the same lengths as the corresponding frame members of the embodiment of FIG. 1. The essential difference is that the lower frame member 34 is one integral part which at the rear end surrounds the rear wheel 12 so that instead of two coaxial ball bearing joints 42 one bearing of the kind as shown in FIGS. 3a and 3b can be employed. Making the rods of the lower frame members 34 one integral unit enhances the rigidity and stability of the frame structure. The greater length of the rear part 44 as compared to the corresponding member of the FIG. 1 embodiment brings about a greater torque in the sitting phase.

The lower frame member 34 extends at the front end thereof beyond the joint 38 and is bent downwards. The pedals 60 are connected to this bent down portion of the lower frame member 34.

A further improvement of the lever ratios is gained by arrangement the bearing of the driving sprocket wheel 20 in front of the joint 38 as shown in FIG. 2.

Deviating from the dimensions specified above for the embodiment of FIG. 1 in case of the FIG. 2 embodiment, the rear part 44 of the lower frame member 34 is 38 cm, and the crank arm 48 is 17 cm, the connecting rod 52 is 46 cm long, and the angle $\alpha$ of the sharp bend of the lower frame member 34 is about 50°.

The design of the joints between the frame members will be explained by reference to FIGS. 3a and 3b, wherein one frame member is designated by A and the others by $B_1$ and $B_2$. In case of joints 36, 54 and 28 frame member A represents the upper frame member 26 and frame members $B_1$ and $B_2$ represent, respectively, the parallel rods of the rear frame member 32, the connecting rods 52, lugs of clamp ring 62 (FIG. 1) or lugs welded to the upper end of front frame member 30 (FIG. 2). Regarding joint 38 frame member A represents front frame member 30 and frame members $B_1$ and $B_2$ represent the parallel rods or rod parts of lower frame member 34. In case of joint 42 of the FIG. 2 embodiment frame member represents for the transitional or web part of lower frame member 34 surrounding the circumference of the rear wheel, whereas frame members $B_1$ and $B_2$ represent the parallel rods of rear frame member 32.

Referring to FIG. 3a a tubular bearing housing 64 is welded to frame member A. It contains a bushing 66 made of Polyamid or some other suitable bearing material. A shaft 68 extends through the bushing 66 and is rotatably guided therein. As shown, shaft 68 is a little bit longer than bushing 66 and bearing housing 64. Frame members $B_1$ and $B_2$ are firmly connected to shaft 68 by screws 70 which extend through holes in frame members $B_1$ and $B_2$ and engage in a threaded central bore in shaft 68.

With a vehicle constructed in accordance with the present invention it is necessary to overcome two dead positions, one position being defined by the uppermost position of the saddle and lowest position of the pedals while the crank arms 48 and the connecting rods 52 are in line, the other position being defined by the lowest position of the saddle and the highest level of the pedals while the crank arms 48 and the connecting rods 52 overlap. Having the rear sprocket wheel 22 unrotatably fixed to the hub of the rear wheel 12 eliminates this problem because the rotating wheel 12 drags the crank arms 48 through the dead positions.

Figure 4:
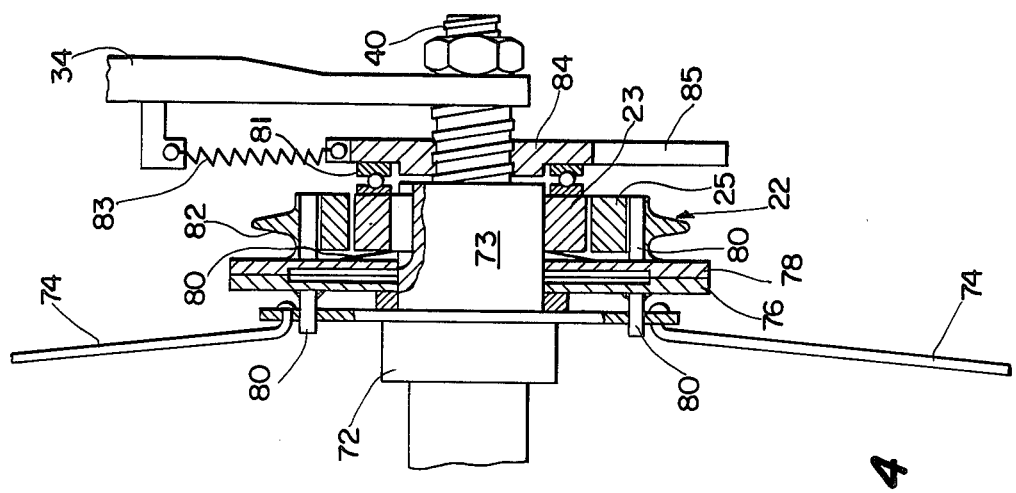
FIG. 4 is a fragmentary section of the hub of the rear wheel with a special friction clutch.

If it is desired temporarily to stop the movements of the saddle and the steering handle while the wheels 10 and 12 are rotating e.g., when travelling downhill there must on the other hand be provision made for overcoming the dead positions of the drive mechanism during normal drive. A first practical embodiment solving this problem is shown in FIG. 4. It comprises a friction clutch, which can be replaced by a block of three or five sprocket wheels for use with a conventional gear shift between the rear sprocket wheel 22 and the hub 72 of the rear wheel, which is depicted by spokes 74. The sprocket wheel 22 is mounted on an outer part 73 of hub 72 so as to be axially slidable but unrotatable thereon, and consists of two parts 23 and 25 connected by a freewheel mechanism, as is conventional.

The friction clutch may consist, as shown, of two cooperating plates or discs 76 and 78, with the first being unrotatably anchored to the hub 72 and the second being unrotatably anchored to the sprocket wheel 22 by means of two or more studs 80 which are welded to each of the discs 76 and 78 and which engage in holes or slots of the hub 72 and the sprocket wheel 22, respectively. The maximum friction torque to be transferred between the discs 76 and 78 is defined by a Belleville spring washer 82 arranged between disc 78 and sprocket wheel 22 and by a nut 84 screwed on the axle 40 of wheel 12 which compresses the washer 82. The friction between discs 76 and 78 need not be great for overcoming the dead positions of the drive mechanism. The discs 76 and 78 should slip whenever the cyclist decides to stop up and down movements while the wheels 10 and 12 are rotating.

In accordance with another aspect of the invention, the embodiment shown in FIG. 4 is also provided with exemplary means for changing the pressure acting between the friction discs 76 and 78 during riding comprising a lever 85 which is integral with nut 84 and which is actuated by a Bowden wire against the action of a spring 83 for turning nut 84. The lever and nut 84 and 85 acts upon the friction discs 76 and 78 via a thrust bearing 81, the sprocket wheel 22 and the Belleville spring washer 82. It is preferred to choose such a tension of the spring 83 that the friction discs 76 and 78 do not slip. Only when the Bowden wire for the lever and nut 84 and 85 is pulled is the clutch disengaged and the movements of the saddle and the pedals stopped.

The embodiment of FIG. 2 is provided with a standard free wheel hub and coaster brake which may also include a 3-speed gear shift. Alternatively a conventional free wheel hub without coaster brake can be used with or without a conventional gear shift of either the open type or the type which is integrated in the hub. Since such hubs do not develop the necessary drag torque for overcoming the dead positions of the drive mechanism FIG. 2 shows another embodiment solving this problem, which is based on the fact that the distance between two points of the rear frame member 32 and the connecting rods 52 a minimum in the highest position of the saddle and a maximum in the lowest position of the saddle. Under these conditions a rod 86 is pivotably connected to the rear frame member 32 and guided, as by a roller 88 supported by the upper frame member 26, to extend beyond the connecting rods 52 at least in the uppermost position of the saddle, and two tension springs 90 and 92 are connected between the rod 86 and the connecting rods 52 in such way that one of the springs, e.g., spring 92, is under greatest tension and the other of the springs, e.g., spring 90, is relieved when the saddle is on the highest level and spring 90 is tensioned and spring 92 relieved when the saddle goes through the lowest position. In each case the tensioned spring, either 92 or 90, respectively, removes the respective dead position. Obviously about the same result can be achieved with only one spring in a middle position between the positions of the two springs 90 and 92 shown in FIG. 2, such that the single spring is under tension in both dead positions.

Figure 5:
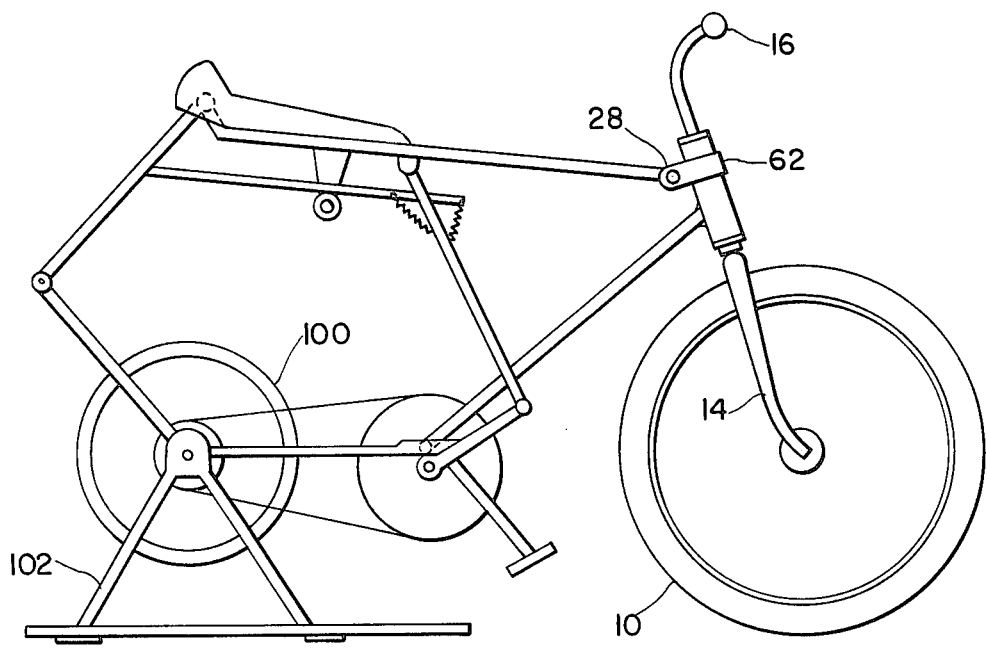
FIGS. 5-8 show further modified embodiments in diagrammatic elevation.
Figure 6:
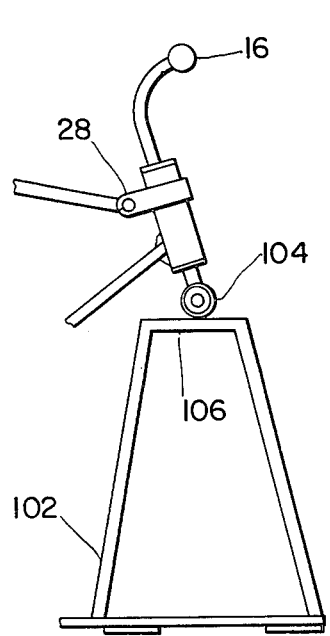
Figure 7:
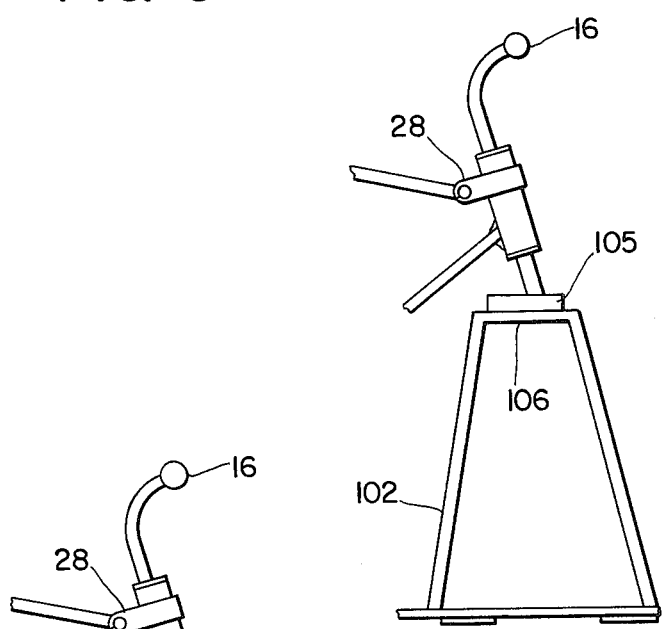
Figure 8:
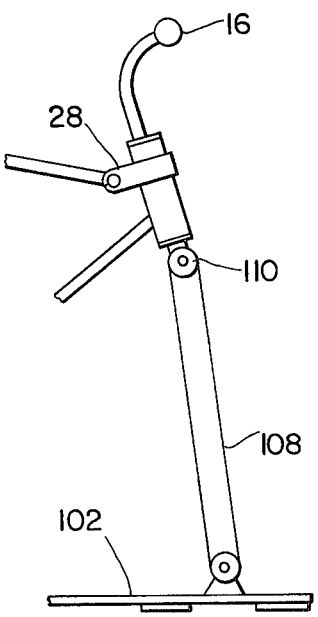

A vehicle constructed in accordance with the present invention can also be adapted for use as a home-trainer similar to conventional bicycle home-trainers for exercising at home. For this purpose it is sufficient to replace the rear wheel 12 by a conventional flywheel 100 and to support the flywheel axle in a conventional stable stand 102 which supports the whole structure in an upright position, as shown diagrammatically in FIG. 5. It is also an optional feature to dispense with the front wheel too and replace it either by at least one conventional roller 104, as shown diagrammatically in FIG. 6, or at least one slide 105, as shown diagrammatically in FIG. 7, which is mounted on front frame member 30 and which is guidingly supported by an essentially horizontal guide rail 106 mounted on stand 102; or by and essentially vertical supporting rod 108 which is pivotally supported on stand 102 and is connected to front frame member 30 by joint 100, as shown diagrammatically in FIG. 8

Although the preferred embodiments of the invention have been illustrated and described in considerable detail, it should be understood that the invention is capable of numerous modifications and variations apparent to those skilled in the art without departing from the spirit and scope of the invention as defined in the claims.

I claim:

1. A two-wheeled vehicle similar to a bicycle comprising a frame having an upper frame member and a lower frame member pivotably connected to a front frame member by joints therebetween, and a rear frame member pivotably connected to the lower and upper frame members by joints therebetween, and wherein the upper frame member carries a saddle, the front frame member is provided with a bearing for a steering handle and a front wheel fork, the lower frame member is supported as a rocker on the axle of a rear wheel such that the rear part of the lower frame member extend beyond the axle, and is provided with a bearing for a driving sprocket wheel of a chain drive transmitting torque to the rear wheel, and the rear frame member is a link between the upper and lower frame members, the vehicle further comprising pedals connected to one of the front and the lower frame members, a crank arm fixed to the driving sprocket wheel and a connecting rod connected between the crank arm and the upper frame member.

2. The vehicle according to claim 1 wherein the upper frame member is a metal tube, and at least one of (i) the saddle and (ii) at least one of the joints between the upper frame member and one of the rear frame member and the connecting rod are adjustable along the upper frame member.

3. The vehicle according to claim 1 wherein the pedals are adjustable as to their level.

4. The vehicle according to claim 1 wherein two parallel crank arms and connecting rods are arranged in parallel disposition.

5. The vehicle according to claim 1 wherein the lower frame member extends in one integral piece along both sides of the rear wheel.

6. The vehicle according to claim 5 wherein the lower frame member has a bend of between 10° and 60° at the axle of the rear wheel such that the rear part of the lower frame member extends in an upward position.

7. The vehicle according to claim 6 wherein the joint between the lower frame member and the rear frame member is located radially outside the rear wheel.

8. The vehicle according to claim 1 wherein the axis of the driving sprocket wheel at least nearly coincides with the axis of the joint between the front frame member and the lower frame member.

9. The vehicle according to claim 8 wherein the axis of the driving sprocket wheel is located in front of the axis of the joint between the front frame member and the lower frame member.

10. The vehicle according to claim 1 wherein the driven sprocket wheel of the chain drive is unrotatably connected to the rear wheel.

11. The vehicle according to claim 1 wherein the driven sprocket wheel of the chain drive is connected to the rear wheel by means of a clutch.

12. The vehicle according to claim 11 wherein the clutch is a pretensioned friction clutch with an adjustable maximum torque.

13. The vehicle according to claim 11 wherein the clutch is disengageable by actuating means.

14. The vehicle according to claim 1 wherein the rear wheel has a free wheel hub and a spring means is connected between the rear frame member and the connecting frame such that the spring means is under tension when the crank arm and the connecting rod are aligned.

15. A home-trainer corresponding to the vehicle according to claim 1 wherein the rear wheel is replaced by a flywheel and the axle of the latter is supported in a stand keeping the frame upright.

16. The home-trainer according to claim 15 wherein the front wheel is replaced by one of at least one roller and at least one slide mounted on the front frame member and being guided by an essentially horizontal guide rail mounted on the stand.

17. The home-trainer according to claim 15 wherein the front wheel is replaced by an essentially vertical supporting rod which is pivotably supported on the stand and is connected to the front frame member by a joint.

* * * * *